United States Patent
Merken-Schiller et al.

(10) Patent No.: US 7,231,752 B2
(45) Date of Patent: Jun. 19, 2007

(54) METHOD AND DEVICE FOR PACKING PRODUCTS IN FILMS AND FILM-PACKED PRODUCT

(75) Inventors: Richard Merken-Schiller, Dusseldorf (DE); Stefan Eberhardt, Aachen (DE); Pamela Czechowski, Heidelberg (DE)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 10/520,674

(22) PCT Filed: Jul. 17, 2003

(86) PCT No.: PCT/EP03/07763

§ 371 (c)(1),
(2), (4) Date: Sep. 2, 2005

(87) PCT Pub. No.: WO2004/007292

PCT Pub. Date: Jan. 22, 2004

(65) Prior Publication Data

US 2006/0117712 A1 Jun. 8, 2006

(30) Foreign Application Priority Data

Jul. 17, 2002 (DE) .............................. 102 32 330

(51) Int. Cl.
  B65B 9/04 (2006.01)
  B65B 51/22 (2006.01)
  B29C 65/08 (2006.01)
  B29C 65/74 (2006.01)

(52) U.S. Cl. ............................ 53/450; 53/453; 53/477; 53/553; 53/559; 53/329.2; 156/73.3; 156/73.4; 156/580.1

(58) Field of Classification Search .................. 53/450, 53/453, 477, 479, 553–555, 559, 561, 329.2–329.5; 156/580.1, 580.2, 73.1, 73.3, 73.4; B29C 65/74; B65B 51/22

See application file for complete search history.

(56) References Cited

U.S. PATENT DOCUMENTS

| | | | | |
|---|---|---|---|---|
| 3,224,915 A | * | 12/1965 | Kuris et al. ................. | 156/73.1 |
| 3,454,450 A | * | 7/1969 | Tyrrell ......................... | 156/499 |
| 3,457,132 A | * | 7/1969 | Tuma et al. ................. | 156/515 |
| 3,481,100 A | * | 12/1969 | Bergstrom .................... | 53/433 |
| 3,651,615 A | | 3/1972 | Bohner et al. | |
| 3,733,238 A | * | 5/1973 | Lawrence et al. ........ | 156/580.1 |
| 3,749,620 A | * | 7/1973 | Montgomery ............... | 156/73.1 |

(Continued)

FOREIGN PATENT DOCUMENTS

EP  94306979.9  5/1995

(Continued)

*Primary Examiner*—Stephen F. Gerrity
(74) *Attorney, Agent, or Firm*—Fulbright & Jaworski LLP; Jan K. Simpson

(57) ABSTRACT

The present invention is directed to a method of wrapping products in films, including the steps of: positioning the products on a first sheet of film which is continuously advanced in one transport direction; covering the products with a second sheet of film, which is continuously advanced in the transport direction and which is aligned plane-parallel to the first sheet of film; ultrasonically welding the first and second films on the outer edges of the products in each case and ultrasonically separating the overlapping films at selected positions; separating the wrapped products or groups of wrapped products.

9 Claims, 4 Drawing Sheets

U.S. PATENT DOCUMENTS

| | | | |
|---|---|---|---|
| 3,750,362 A * | 8/1973 | Kishpaugh et al. | 53/433 |
| 3,874,143 A | 4/1975 | Braber | |
| 4,094,119 A * | 6/1978 | Sullivan | 53/400 |
| 4,157,719 A * | 6/1979 | DeWoskin | 156/73.3 |
| 4,461,662 A * | 7/1984 | Onishi | 156/73.4 |
| 4,606,786 A * | 8/1986 | Andersson | 156/580.1 |
| 4,684,025 A * | 8/1987 | Copland et al. | 206/484 |
| 4,704,844 A * | 11/1987 | Mancini | 53/453 |
| 5,181,610 A * | 1/1993 | Quick et al. | 206/447 |
| 5,268,179 A * | 12/1993 | Rudella | 424/449 |
| 5,418,022 A * | 5/1995 | Anderson et al. | 428/35.2 |
| 5,837,336 A | 11/1998 | Ichimura et al. | |
| 6,326,069 B1 | 12/2001 | Barnett et al. | |

FOREIGN PATENT DOCUMENTS

| | | | |
|---|---|---|---|
| JP | 55-97355 A | * | 7/1980 |
| JP | 3-158227 A | * | 7/1991 |
| JP | 6-270258 A | * | 9/1994 |
| JP | 06270258 | | 9/1994 |
| WO | WO 01/83316 | | 11/2001 |

* cited by examiner

METHOD AND DEVICE FOR PACKING PRODUCTS IN FILMS AND FILM-PACKED PRODUCT

CROSS-REFERENCE TO RELATED APPLICATIONS

This application is a National Stage of application PCT/EP03/07763 filed on Jul. 17, 2003 claiming priority to DE 102 32 330.5 filed Jul. 17, 2002.

TECHNICAL FIELD

The invention relates to a method of wrapping products in films, comprising the steps of: positioning the products on a first sheet of film which is continuously advanced in one transport direction; and covering the products with a second sheet of film, which is continuously advanced in the transport direction and which is aligned plane-parallel to the first sheet of film. The invention further relates to a device for wrapping products in films in accordance with such a method, and to a film-wrapped product, especially confectionery, which is wrapped between two films.

BACKGROUND OF THE INVENTION

Products, especially confectionery such as sweets, chocolates, etc., are conventionally wrapped in wrapping paper. This involves the disadvantage that the product is not wrapped hermetically until the time of consumption.

It is also known to wrap products in films which are plasticized and welded by the application of heat. As a consequence of the heating effect, there is a risk that the product could be affected as well and that it could melt, at least in parts.

Sensitive products are conventionally wrapped by bonding films together. This is relatively complicated, especially because the adhesive has to be applied thinly and evenly to the bonding sites. Furthermore, the adherents are relatively large.

The object of the invention was therefore to provide an improved method and an improved device for wrapping products in films, in order in particular to make economical mass production possible and to obtain hermetically wrapped products.

BRIEF SUMMARY OF THE INVENTION

The object is achieved in accordance with the invention, using the generic method, by the steps of:

ultrasonically welding the first and second films on the outer edges of the products in each case and ultrasonically cutting the overlapping films at selected positions, and separating the wrapped products or groups of wrapped products.

Unlike the conventional film wrappings for products, it is now proposed that the film be bonded together by ultrasonic welding at the outer edges of the products. In the process, the overlapping films can be cut ultrasonically at the same time at selected positions, and the individual wrapped products separated from each other.

The ultrasonic welding and ultrasonic cutting can be performed at a high clock rate on a wrapping line, with the products being positioned between two continuously advanced sheets of film.

The ultrasonic welding and separation process is preferably performed with a supporting table aligned plane-parallel to one of the films for an adjacent sheet of film. Opposite the supporting table and plane-parallel thereto, a welding punch is disposed above the other sheet of film, the welding punch being moved towards the supporting table to perform the ultrasonic welding and separation. By exciting the welding punch and/or the supporting table with ultrasonic oscillations and pressing the films together on the supporting table at the welding and cutting edges with the welding punch, defined welding seams and cutting edges are then created.

It is particularly advantageous if the supporting table has an integrated sonotrode device to generate an ultrasonic oscillation on the surface of the supporting table. The films are then pressed onto the supporting table in the region of the welding and cutting edges of the welding punch, which is not excited. The welding and cutting edges are an image of the welded and cut edges of the wrapped products.

In this way, it is possible to produce the welding punch relatively inexpensively for various products, since no sonotrode arrangement needs to be integrated into the welding punch and the propagation conditions of the ultrasound waves, which are dependent on the shape of the individual product, do not have to be taken into account when designing the welding punch. Instead, a universal supporting table with an integrated sonotrode arrangement can be used for any shape of the welding punch. In this way, the tooling costs and set-up work can advantageously be reduced.

In addition, it is advantageous to pre-shape at least one film to receive the products before the step of positioning the product on the sheet of film. In the process, indentations can be introduced into the film be thermal, mechanical, or vacuum shaping or the like, in order to receive the products. The problem is further solved by the generic device in accordance with the invention with:

a first conveyor means for continuously advancing a first sheet of film, a positioning means for positioning products on the first sheet of film, a second conveyor means for covering the products positioned on the first sheet of film with a second sheet of film, which is aligned plane-parallel to the first sheet of film, a fixed supporting table with an integrated sonotrode arrangement for generating ultrasonic oscillations and an opposing welding punch disposed plane-parallel to the supporting table, the welding punch having welding and cutting edges as an image of the welding and cut edges to be produced in the wrapped products.

The welding punch is mounted on the supporting table such as to move towards and away from the supporting table. The sheets of film with the products held between them are guided between the supporting table and the welding punch.

By pressing the welding and cutting edges of the welding punch onto the supporting table and exciting the supporting tables with ultrasonic oscillations, defined welding and cutting seams are produced on the welding and cutting edges of the overlapping sheets of film.

The device preferably also has at least one pre-shaping means for pre-shaping at least one of the film walls such that the products can be received in indentations in the pre-shaped films.

The welding and cutting edges of the welding punch are preferably shaped in such a way that a pull-tab is formed on an outer edge of the product wrapping and the first and second films are not welded together in the region of the pull-tab.

The problem in ultrasonically sealing products in films consists in the fact that, even with very narrow welding seams, the latter are stable.

It has further become apparent that it is possible to tear open an ultrasonically welded product wrapping without undue force if a welding seam or cut line runs transversely from the pull-tab into the welding seam on the outer edge of the product wrapping. The welding and cutting edges of the welding punch are therefore preferably shaped in such a way that a welding seam or cut line of this kind running transversely into the welding seam on the outer edge of the product wrapping is formed.

In addition, it is advantageous if the welding and cutting edges of the welding punch are formed in such a way that a cut line between two outer edges of the product wrapping runs transversely across one of the films of the product wrapping. When the product wrapping is bent over along the cut line, the product wrapping breaks open at the cut line, which forms a defined breaking point.

The object is further achieved by a film-wrapped product, especially confectionery, in which the films are ultrasonically welded together along the entire outer edges of the product and at least one pull-tab is provided at an outer edge.

The film-wrapped product preferably has a welding seam or cut line in the pull-tab, which runs transversely into a welding seam at the outer edge of the product wrapping, so that the welding seam can be separated at the outer edge without undue effort.

Preferably, the film-wrapped product also has a cut line between two outer edges of the product wrapping, which runs transversely across one of the films of the product wrapping.

In a particular embodiment, especially when it is a question of producing prototypes of product wrappings, it is proposed to provide a movable pressure roller above the supporting table, which can be guided across any sheets of film in a controlled manner and with a defined pressure. In this way, contours for ultrasonic welding and/or ultrasonic separation can be traced out with the pressure roller in a freely selectable manner.

BRIEF DESCRIPTION OF THE DRAWINGS

The invention will now be described in more detail with reference to the attached drawings, in which.

DETAILED DESCRIPTION OF THE INVENTION

Figure 1:
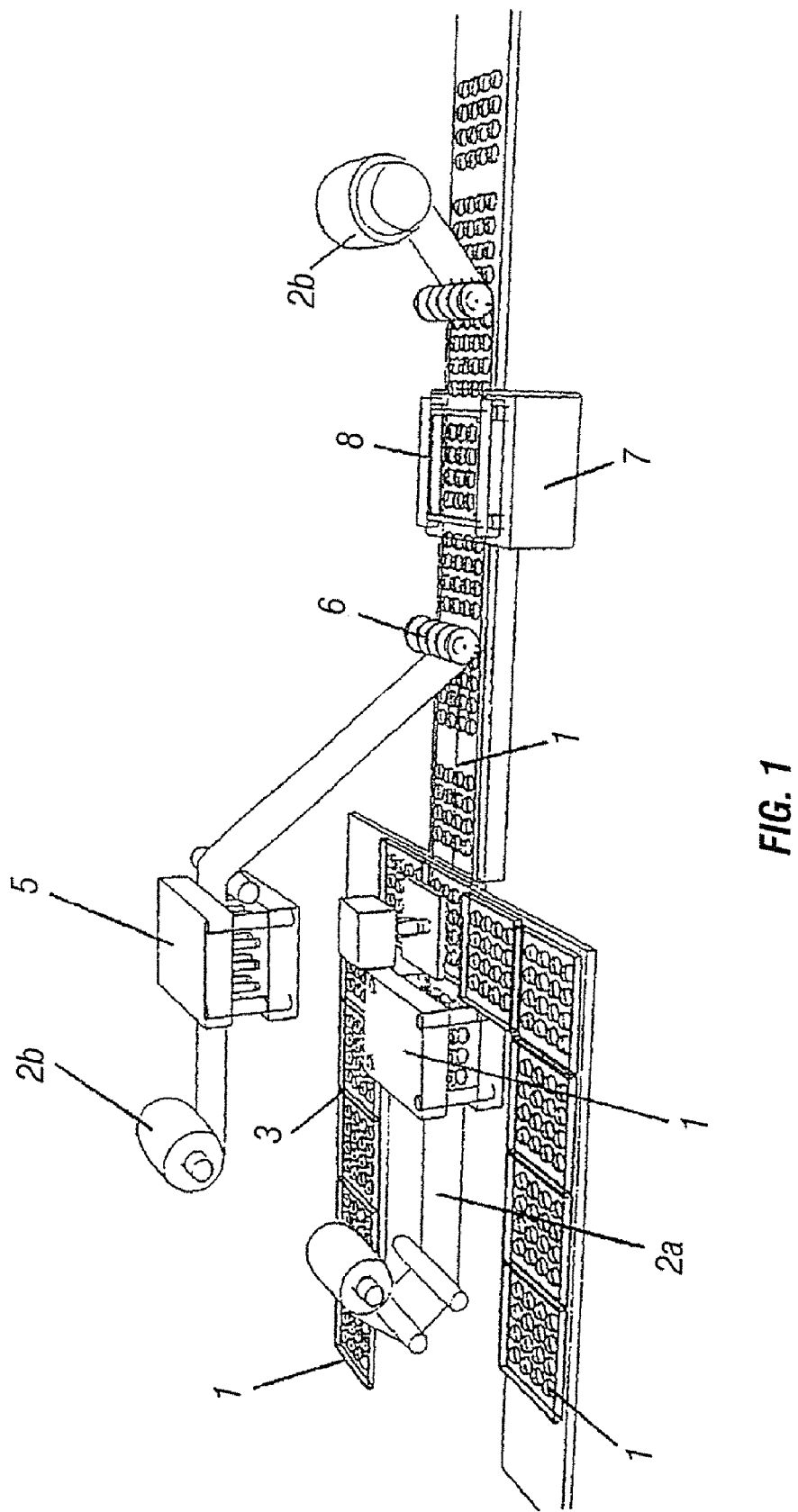
FIG. 1 shows a perspective schematic view of a device for wrapping products in films in accordance with the invention.

FIG. 1 illustrates a first embodiment of a device for wrapping products 1 in films 2 *a*, *b* in a schematic perspective view. The strips of film 2 *a*, 2 *b* are continuously unrolled from a roll and are each advanced by a conveyor means. The products 1 on product supports 3 are transported to the first sheet of film 2 *a* and positioned on the first sheet of film 2 *a* by means of a positioning device 4. For this purpose, the positioning device 4 is equipped with suitable gripped means so that it may serve as a handling device. After the products 1 have been positioned on the first sheet of film 2 *a*, the products 1 are advanced further in the transport direction and covered with the second sheet of film 2 *b*. For this purpose, the second sheet of film 2 *b* is aligned plane-parallel to the first sheet of film 2 *a*.

The second sheet of film 2 *b* is pre-shaped by means of a pre-shaping means 5 in such a way that indentations are created in the film to receive the products accurately. To align the indentations to the products accurately when the second sheet of film 2 *b* is placed on the products 1 and the first sheet of film 2 *a*, an equalizing roller 6 is provided.

After the products 1 have been covered by the second sheet of film 2 *b*, ultrasonic welding and ultrasonic cutting are performed. For this purpose, a supporting table 7 is provided beneath the first sheet of film 2 *a*, in which a sonotrode device to generate an ultrasonic oscillation is integrated. Disposed opposite the supporting table 7 is a welding punch 8 which is aligned plane-parallel thereto and is mounted such as to move towards the supporting table 7 and away from the supporting table 7. The welding punch 8 has raised welding and cutting edges, which are an image of the welded and cut edges to be produced in the wrapped products.

The welding punch is pressed firmly against the welding and cutting edges on the supporting table 7, so that the overlapping films of the sheets of film 2 *a*, 2 *b* are excited by the ultrasonic oscillation of the supporting table 7. In the process, a very stable welding seam or cut edge is produced, depending on the design of the welding and cutting edges of the welding punch 8.

In this context, the welding punch 8 is designed to be independent of the specific product, thanks to the welding and cutting edges. Using the universal supporting table 7 with an integrated sonotrode device, it is now possible to produce and provide the welding punch 8 as a replaceable tool relatively inexpensively for various product shapes.

After ultrasonic welding and separation, the second sheet of film 2 *b*, reduced by the portions welded to the first sheet of film 2 *a* in order to wrap the products 1, are rolled up again and the wrapped products are separated.

Figure 2:
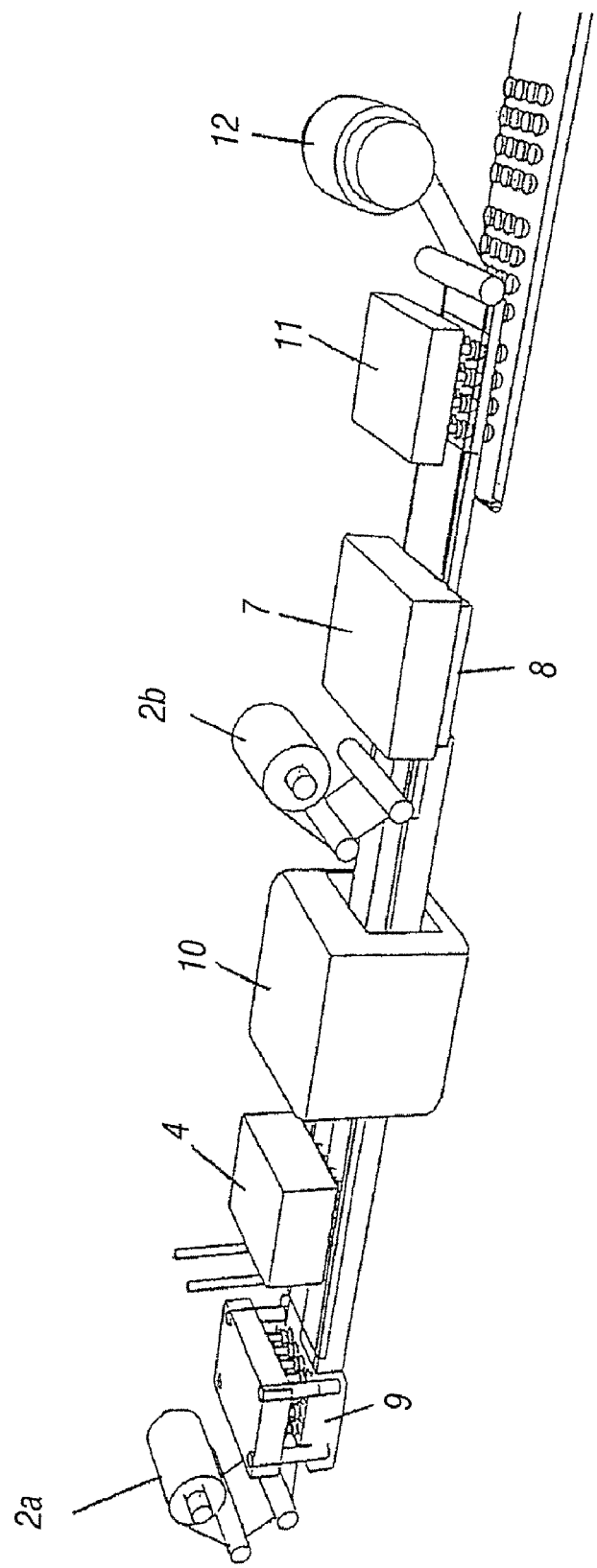
FIG. 2 shows a perspective view of a different embodiment of a device for wrapping products in films in accordance with the invention.

FIG. 2 illustrates a different embodiment of a device for film-wrapping products 1 in accordance with the invention, in which the first sheet of film 2 *a* is pre-shaped with a pre-shaping means 9 in such a way that indentations to receive the products 1 are formed. Pre-shaping can be performed by thermal means, for example, by vacuum drawing, or by some other shaping process. FIG. 2 shows a sketch of a pre-shaping means 9 with a semi-flexible moulding base and a moulding press capable of being moved relative to the moulding base.

Seen in the transport direction, a positioning device 4 is disposed downstream of the pre-shaping means 9 to position the products 1 on the first sheet of film 2 a. In the embodiment illustrated, the positioning device 4 is designed as a filling means, in order to fill the product in the indentations created in the first sheet of film 2 a. The product 1 can in this case be a piece of confectionery, for example, and especially a solid piece of chocolate.

The first sheet of film 2 a, with the product 1 filled in the indentations, then passes through a cooling section 10. After that, a second sheet of film 2 b, which is aligned plane-parallel to the first sheet of film 2 a, is placed over the first sheet of film 2 a. For this purpose, the second sheet of film 2 b is continuously unrolled onto the first sheet of film 2 a and completely covers the product 1 filled in the indentations.

Disposed above the second sheet of film 2 b is a supporting table 7 with an integrated sonotrode device, generating ultrasonic oscillations. Opposite the supporting table and movable relative to it is a welding punch 8 with welding and cutting edges each abutting the outer edges of the indentations formed in the first sheet of film 2 a. When the welding and cut edges of the welding punch 8 are pressed against the supporting table 7, with the first and second sheets of film 2 a, 2 b with the product 1 filled in being located between the supporting table 7 and the welding punch 8, the ultrasonic oscillations are directed through the first and second films 2 a, 2 b at the welding and cutting edges of the welding punch 8, and welding and cut seams are produced.

After that, the film-wrapped products 1 are separated by means of an automatic separator 11. The residual film remaining is then rolled up 12.

As a result of ultrasonically welding the first and second sheets of film 2 a, 2 b together, very thin, but nevertheless extremely durable welding seams can be created.

Figure 3:
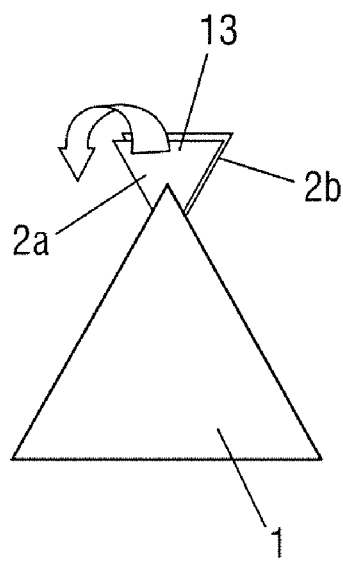
FIG. 3 shows a top plan view of a film-wrapped product with a pull-tab.

In order to make it possible for the consumer later on to tear open the products 1, especially consumer products, it is advantageous to form a pull-tab at the outer edges of the product 1. FIG. 3 illustrates a film-wrapped product 1 of this kind with a pull-tab 13 in a top plan view. The pull-tab 13 is formed from portions of the first sheet of film 2 a and second sheet of film 2 b projecting at the outer edges of the product 1. The first and second sheets of film 2 a, 2 b are preferably stuck together in the region of the pull-tab 13 with an adhesive mass.

Figure 4:
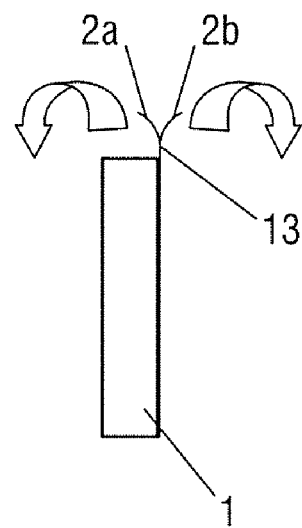
FIG. 4 shows a cross-sectional view of the film-wrapped product from FIG. 3.

FIG. 4 illustrates the film-wrapped product from FIG. 3 in a cross-sectional view. It is apparent that the product wrapping can be torn open by pulling apart the two portions of the pull-tab 13, i.e. the portions of the first and second sheets of film 2 a, 2 b. The two sections of the pull-tab 13 are releasably stuck together with an adhesive for this purpose.

Figure 5:
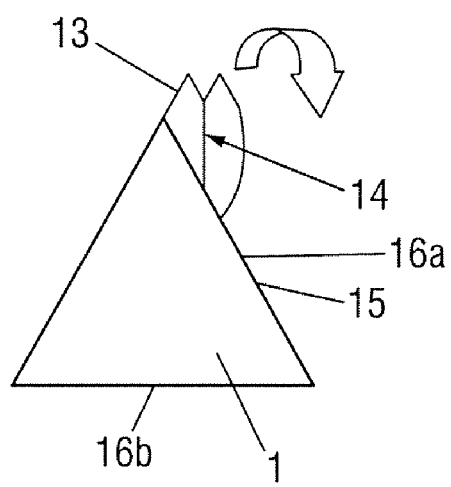
FIG. 5 shows a top plan view of a film-wrapped product with a pull-tab and a seam running transversely to the outer edge.

FIG. 5 illustrates a further embodiment of a film-wrapped product in a top plan view. In one region of an outer edge of the product wrapping, a welding seam or cut line 14 is formed, which runs transversely into a welding seam 15 at the outer edge of the product wrapping. In this way, a breaking point is formed at the pull-tab 13, so that the pull-tab 13 can be split into two halves and the product wrapping van then be torn further apart along the welding seam 15 at the outer edge.

Figure 6:
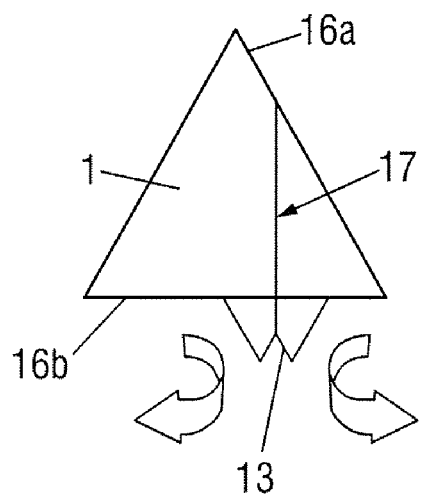
FIG. 6 shows a top plan view of a film-wrapped product with a cut line between two outer edges.

FIG. 6 illustrates a further embodiment of the film-wrapped product 1, in which a cut line 17 runs transversely across one of the films of the product wrapping between two outer edges 16 a, 16 b, which defines a breaking point in the product wrapping. The cut line 17 extends into one pull-tab 13, which abuts the outer edge 16 b of the product wrapping. When the product wrapping is bent over at the cut line 17, it can be torn open and easily opened with the aid of the pull-tab 13.

Figure 7:
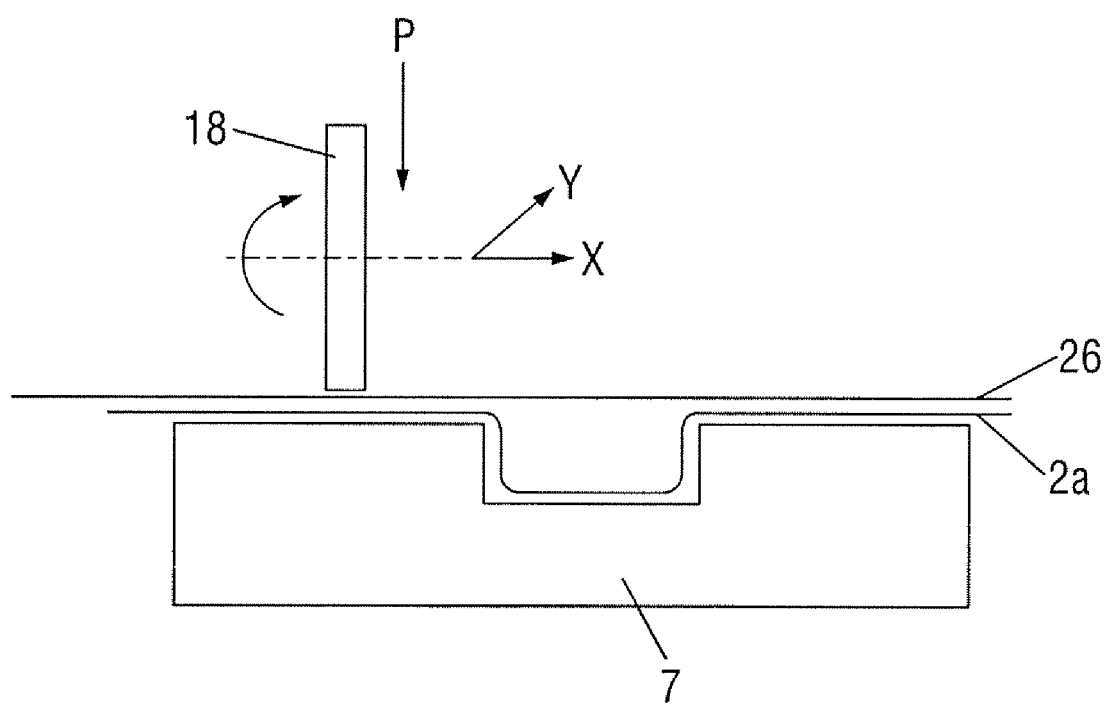
FIG. 7 shows a side plan view of a portion of a different embodiment of a device for wrapping products in films in accordance with the invention.

In a particular embodiment which is not shown, especially in order to produce prototypes of product wrappings, a pressure roller 18 as shown in FIG. 7, which can be moved in a freely controlled manner, is provided above the supporting table 7, which pressure roller 18 is guided across the second sheet of film 2 b according to the contours to be welded or cut. The pressure P exerted on the supporting table 7 by the pressure roller 18 via the first and second sheets of film 2 a, 2 b is variable depending on the requirements to be met by the ultrasonic welding seam or cut seam. The pressure roller 18 can be guided with an X-Y carriage, a robot pivot arm or the like, computer-controlled guidance of the pressure roller 18 being provided.

What is claimed is:

1. A method of wrapping products in films comprising the steps of:
   positioning the products on a first sheet of film which is continuously advanced in one transport direction;
   covering the products with a second sheet of film, which is continuously advanced in the transport direction and which is aligned plane-parallel to the first sheet of film,
   ultrasonically welding the first and second films on the outer edges of each of the product wrappings and ultrasonically cutting the overlapping films at selected positions;
   forming a pull-tab on an outer edge of the product wrapping;
   forming a welding seam or cut line in the pull-tab, said welding seam or cut line running transversely into a welding seam on the outer edge of the product wrapping; and
   separating the wrapped products or groups of wrapped products.

2. The method as claimed in claim 1, wherein the ultrasonic welding and ultrasonic cutting are performed with a welding punch disposed opposite a supporting table and plane-parallel above one film, the welding punch and supporting table being moved towards one another for ultrasonic welding and ultrasonic cutting.

3. The method as claimed in claim 2, further comprising the steps of generating an ultrasonic oscillation on the surface of the supporting table with a sonotrode device integrated in the supporting table and pressing the films onto the supporting table in the region of welding and cutting edges of the welding punch, wherein welded and cut edges of the wrapped products are an image of the welding and cutting edges of the welding punch.

4. The method as claimed in claim 1, wherein at least one film is pre-shaped to receive the products before the step of positioning the products on the sheet of film.

5. A device for wrapping products in films, the device comprising:
   a first conveyor means for continuously advancing a first sheet of film;
   a positioning means for positioning products on the first sheet of film;
   a second conveyor means for covering the products positioned on the first sheet of film with a second sheet of film, which is aligned plane-parallel to the first sheet of film;
   a fixed supporting table with an integrated sonotrode arrangement for generating ultrasonic oscillations;
   an opposing welding punch disposed plane-parallel to the supporting table, said welding punch having welding and cutting edges mounted above the supporting table such as to move towards and away from the supporting table;
   said sheets of film with the products held therebetween being guided between the supporting table and the welding punch;

wherein the welding and cutting edges of the welding punch are formed in such a way that a pull-tab is formed on an outer edge of the product wrapping; and a welding seam or cut line is formed in the pull-tab, said welding seam or cut line running transversely into a welding seam on the outer edge of the product wrapping.

6. A method of wrapping products in films comprising the steps of:

positioning the products on a first sheet of film which is continuously advanced in one transport direction;

covering the products with a second sheet of film, which is continuously advanced in the transport direction and which is aligned plane-parallel to the first sheet of film, ultrasonically welding the first and second films on the outer edges of each of the product wrappings and ultrasonically cutting the overlapping films at selected positions;

forming a cut line between two outer edges of the product wrapping, said cut line running transversely across one of the films of the product wrapping; and separating the wrapped products or groups of wrapped products.

7. A method of wrapping products in films comprising the steps of:

positioning the products on a first sheet of film which is continuously advanced in one transport direction;

covering the products with a second sheet of film, which is continuously advanced in the transport direction and which is aligned plane-parallel to the first sheet of film, ultrasonically welding the first and second films on the outer edges of each of the product wrappings and ultrasonically cutting the overlapping films at selected positions;

separating the wrapped products or groups of wrapped products;

wherein the ultrasonic welding and/or ultrasonic cutting are performed with a pressure roller disposed opposite and plane-parallel to the supporting table above one film, said pressure roller being guided across said film according to contours to be welded and cut, with pressure exerted on the supporting table for ultrasonic welding and/or ultrasonic cutting.

8. A device for wrapping products in films, the device comprising:

a first conveyor means for continuously advancing a first sheet of film;

a positioning means for positioning products on the first sheet of film;

a second conveyor means for covering the products positioned on the first sheet of film with a second sheet of film, which is aligned plane-parallel to the first sheet of film;

a fixed supporting table with an integrated sonotrode arrangement for generating ultrasonic oscillations;

an opposing welding punch disposed plane-parallel to the supporting table, said welding punch having welding and cutting edges mounted above the supporting table such as to move towards and away from the supporting table;

said sheets of film with the products held therebetween being guided between the supporting table and the welding punch;

wherein the welding and cutting edges of the welding punch are formed in such a way that a cut line between two outer edges of the product wrapping is formed that runs transversely across one of the films of the product wrapping.

9. The device as claimed in claim 8, further including at least one pre-shaping means for at least one of the sheets of film such that the products can be received in indentations in the pre-shaped films.

* * * * *